United States Patent [19]
Webb

[11] Patent Number: 5,676,468
[45] Date of Patent: Oct. 14, 1997

[54] SELF-ALIGNING BEARING FOR USE IN SEVERE ENVIRONMENTS

[76] Inventor: John P. Webb, 17273 Red Shale Hill Rd., Pekin, Ill. 61554

[21] Appl. No.: 353,883

[22] Filed: Dec. 12, 1994

[51] Int. Cl.$^6$ .................................................. F16C 23/04
[52] U.S. Cl. ...................... 384/208; 384/901; 384/906
[58] Field of Search ................................ 384/206, 208, 384/213, 901, 906

[56] References Cited

U.S. PATENT DOCUMENTS

| | | |
|---|---|---|
| 2,767,034 | 10/1956 | McCloskey . |
| 2,827,340 | 3/1958 | Johnson . |
| 3,522,976 | 8/1970 | Spyra . |
| 3,623,782 | 11/1971 | Nakanishi et al. .............. 384/906 |
| 4,109,976 | 8/1978 | Koch . |
| 4,355,250 | 10/1982 | Langdon . |
| 4,652,152 | 3/1987 | Brandenstein et al. . |
| 4,739,867 | 4/1988 | Harrington . |
| 4,986,675 | 1/1991 | Dye et al. . |
| 5,219,232 | 6/1993 | Adams et al. . |
| 5,251,986 | 10/1993 | Arena . |

OTHER PUBLICATIONS

Catalog excerpts, "Spherical Plain Bearings", SKF Plain Bearings, USA, No. 713-112, Jul. 1993, pp. 2-7, 12, 13, 19.
Promotional literature, "Dodge® Solidlube ... the problem solver", Dodge Reliance Electric, No. A214-1, Jun. 1981.

Catalog excerpts, "McGill® Precision Bearings", McGill Manufacturing, Catalog 92, pp. 88-104, 118, 124 (no date).

Drawing SAF-22518, "SAF-22518 'A' Style Split Pillow Block Assembly", SKF Industries, Inc., dated Feb. 25, 1993 (as received on behalf of applicant on Nov. 23, 1994).

*Primary Examiner*—Lenard A. Footland
*Attorney, Agent, or Firm*—Brinks Hofer Gilson & Lione

[57] ABSTRACT

A bearing includes a first race in operational contact with a shaft, a second race in operational contact with the first race, and a third race in operational contact with the second race. The first, second and third races cooperate to define an aperture therethrough to the shaft. A connector is disposed through the aperture to functionally interlink the first race, the second race and the shaft to insure that the first race and the second race rotate substantially with the shaft. In operation, the first and second races define a first bearing surface that accommodates angular displacements of the shaft, and the second and third races define a second bearing surface that accommodates axial and rotational movements of the shaft.

23 Claims, 5 Drawing Sheets

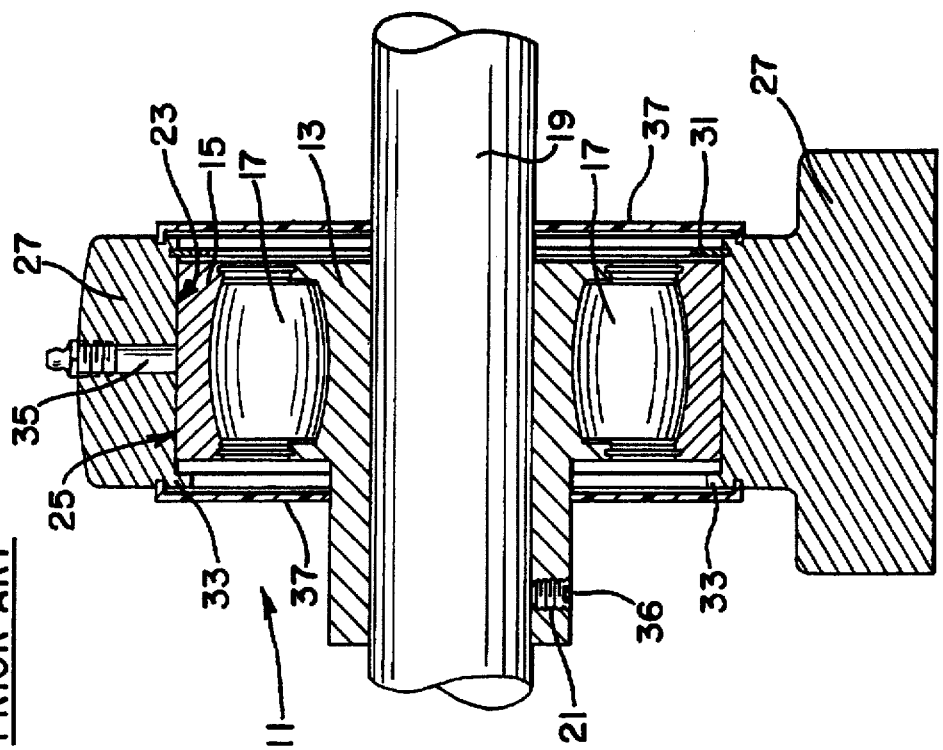
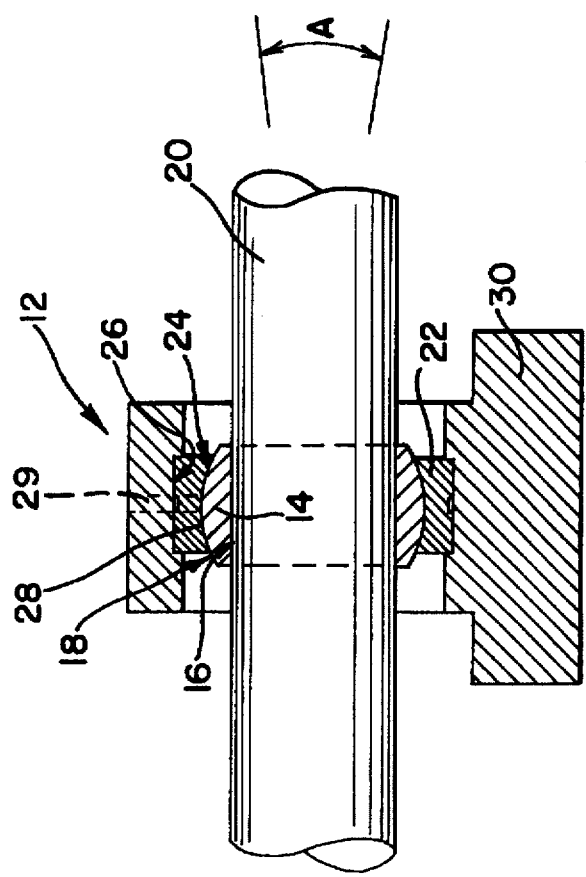

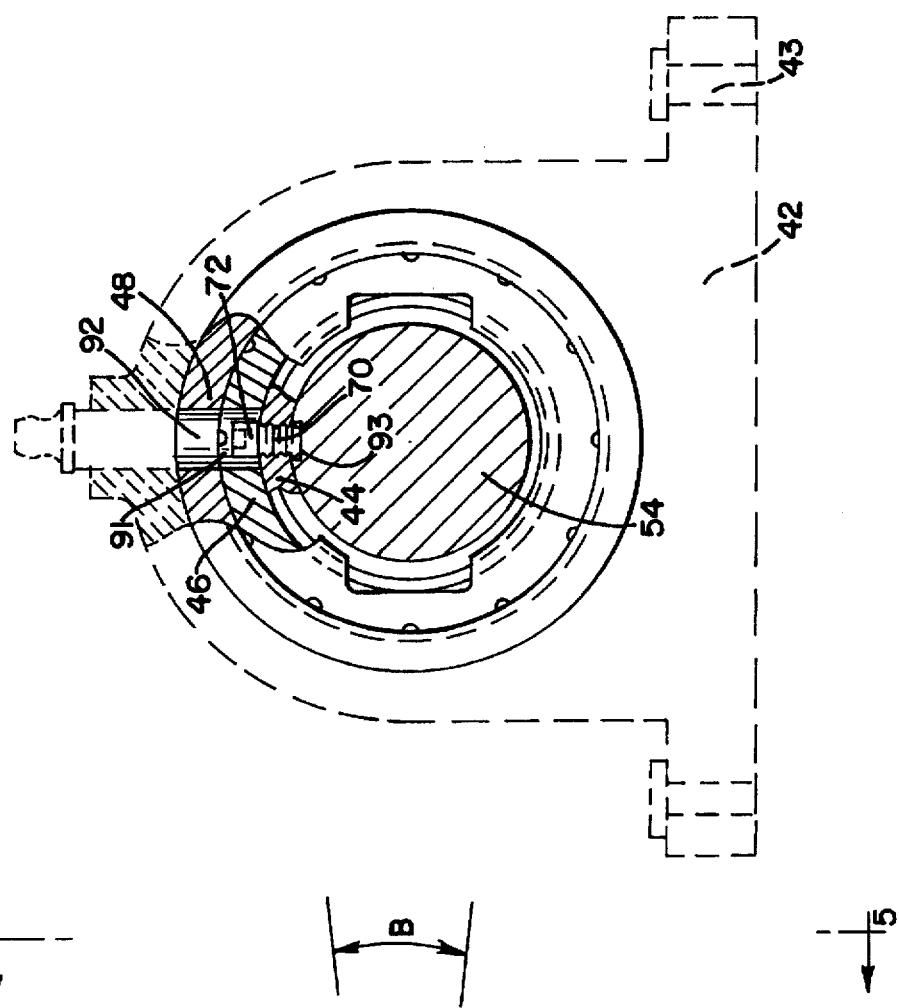
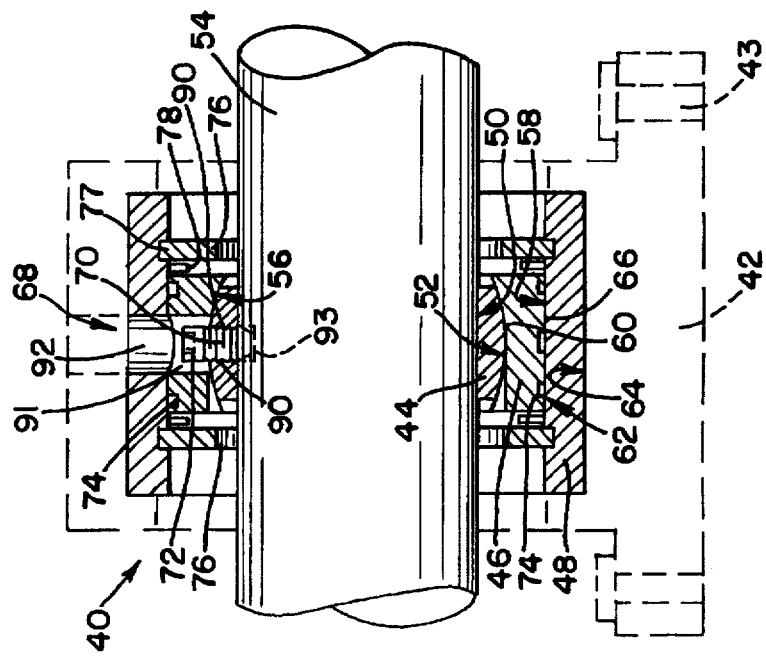

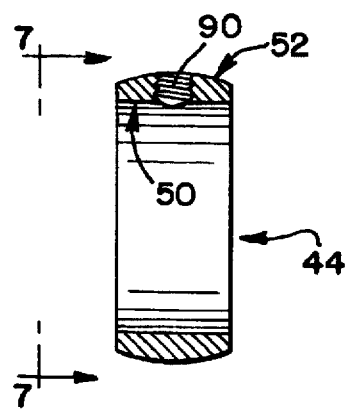
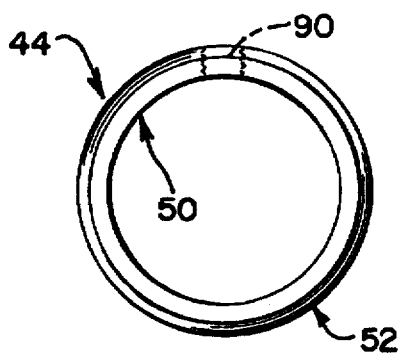
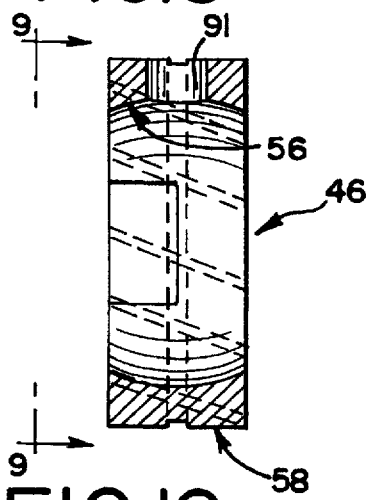
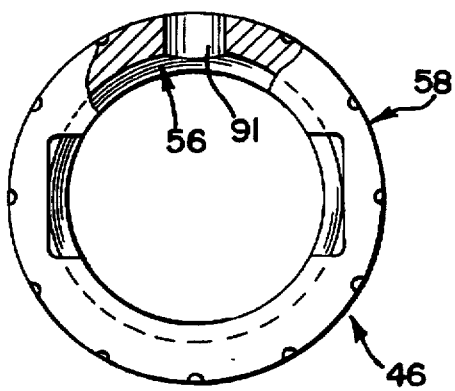
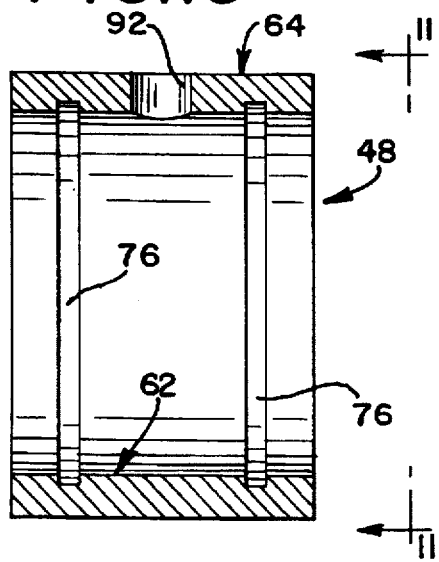
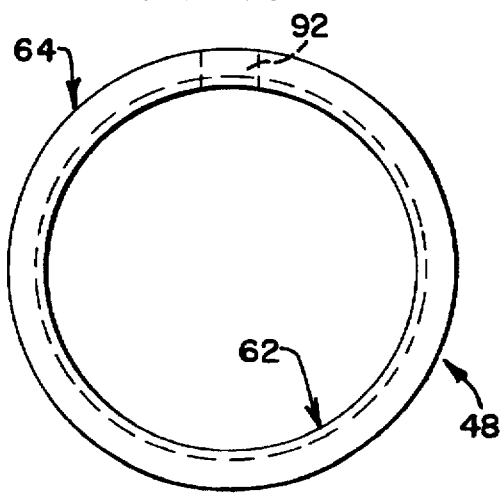

SELF-ALIGNING BEARING FOR USE IN SEVERE ENVIRONMENTS

BACKGROUND OF THE INVENTION

The present invention relates generally to self-aligning bearings, and more particularly to self-aligning spherical bearings for use in severe environments.

Many industrial applications require controllable louvers for adjusting or directing air flow. By way of example, the large coal-burning furnaces in coal-fired power plants have several high capacity fans, including combustion air supply fans, temperature control fans (which inject cool air into the furnace to adjust the internal temperature thereof and prevent overheating), and induction fans (which create a positive draft through the exhaust stack). The air volume delivered by these fans is controlled by louvers disposed in the air stream and, of course, by the rotational speed of the fans. The louvers are opened and closed as needed to adjust the air volume flow generated by the fans. Similar louvers are used in many industrial reactors and air management systems.

During normal operation, these louvers may often remain in one position (e.g., open) for extended periods of time (e.g., days or even months). However, when a situation develops that necessitates a change in the volume of air flow, it is often necessary for these louvers to rotate quickly and reliably. Typically, these louvers are formed from several vanes mounted on pivotable support shafts. The shafts are supported at each end in bearings that allow the louver vanes to be moved when necessary.

These louvers must often operate in a severe thermal, vibrational and contaminant environment. For example, in power plant environments, some of the louvers are exposed to extreme temperature fluctuations (e.g., from ambient temperature when the furnace is shut down to temperatures reaching 600° F. when the furnace is in operation). These extreme temperature fluctuations can distort (through thermal expansion and contraction) some of the constituent parts of the louvers and bearings, and can result in one or more bearings binding and failing. For example, where the air stream through a louver is heated, the vanes and support shafts may lengthen due to thermal expansion, whereas the support frame may not. In addition, dust and fly ash are always present in coal-fired power plants. These contaminants often work their way into the bearings over time and may cause one or more to bind. Moreover, the vibrations induced by the furnace, the fans and the other operating parts of the power plant can cause the bearings to go out of alignment, or to deform (e.g., develop indentations or flats at points of contact). As a result, when it becomes necessary for the louver vanes to change position (which may occur after their being stationary for weeks or months), one or more bearings may seize. Since the vanes are typically interconnected so that they may be moved in unison by a common drive mechanism, failure of even one of the many bearings can cause the vanes to fail to rotate as desired. Such failures can result in degraded performance, excessive pollution emissions and furnace temperatures, and even dangerous operating conditions.

Conventional ball, roller or spherical roller bearings have been or could be used to support the vane shafts of the louvers. In particular, some conventional spherical roller bearings allow for a limited degree of axial shaft expansion, which is desirable because of the temperature fluctuations noted and discussed above. The ability of spherical roller bearings to accommodate for an axial shaft expansion may be provided, in at least two conventional designs, by allowing a first (i.e., inner) race and the rollers to move with respect to a second (i.e., outer) race or by permitting the inner race, the outer race and the rollers to move together with respect to the bearing housing.

However, spherical roller bearings, as well as ball and roller bearings, are unable to tolerate high vibrational loads in the absence of frequent rotation. When the vanes (and thus the bearings) are maintained in a fixed position for extended time periods, the balls or rollers remain in contact with localized areas of the corresponding races. These small areas are therefore subjected to long-term, high vibrational loads, which may cause deformation of the rollers or balls and/or the bearing races. These deformations would increasingly degrade the smooth rotational motion required of the bearings, and the bearings could eventually bind and fail.

Lubricants may be used to minimize some of the failure problems discussed above, but they often break down and fail at high temperatures and can actually increase the risk of particulate contamination. In general, lubricants alone have not provided satisfactory answers to the above-described problems.

In an effort to therefore minimize the potential for bearing failures and the resulting problems they can cause, operators typically replace the vane support bearings periodically, before failure occurs. However, even new bearings of known designs may be subject to certain failure modes, such as binding when a louver is exposed to severe or uneven temperature conditions. The frequent replacement of bearings is an expensive operation in view of the high cost of each bearing, the number of bearings required for a typical louver, and the number of louvers in a typical installation. Labor costs and the down-time required to access and replace the bearings make replacement a highly undesirable (though previously necessary) answer.

SUMMARY OF THE INVENTION

To overcome the above-described problems, the present invention provides a self-aligning spherical bearing that can accommodate changes in both the angular orientation and the axial orientation of a shaft. Furthermore, the bearing incorporates a seal assembly and other features that make it substantially immune from seizure and relatively impervious to severe working environments.

According to a first aspect of the present invention, a bearing includes a first race having first and second surfaces. The first surface of the first race is in operational contact with a shaft. An aperture having a first dimension is defined in the first race and extends to the shaft. The bearing also includes a second race having an inner surface in operational contact with the second surface of the first race. The inner surface of the second race and the second surface of the first race cooperate to define a spherical contact surface. A second aperture, which is aligned with the aperture in the first race, is defined in the second race and has a second dimension that is larger than the first dimension. Further, the bearing includes a third race in operational contact with the second race. A connector is disposed through the first and second apertures to functionally interlink the first race, the second race and the shaft. In operation, the connector is able to move within the second aperture to accommodate an angular displacement of the shaft, which is borne by the spherical contact surface.

According to a second aspect of the present invention, a bearing includes first, second and third races. The first race has a first inner surface operatively associated with a shaft, and a first outer surface. The second race includes a second inner surface, and a second outer surface having a first axial dimension. The second inner surface is in direct operational contact with the first outer surface of the first race. In addition, the third race includes a third inner surface in operational contact with the second outer surface of the second race. The third inner surface has a second axial dimension that is greater than the first axial dimension. In operation, the second race is able to move axially along the third race to accommodate axial movements of the shaft.

According to a third aspect of the present invention, a bearing includes a first race having a first inner surface operatively associated with a shaft, and a first outer surface. A second race includes a second inner surface and a second outer surface. The second inner surface is in operational contact with the first outer surface of the first race. Further, a lost motion connector functionally interlinks the second race. In operation, the shaft rotates through a limited arc without rotating the second race, but thereafter the second race rotates substantially with the shaft.

According to a fourth aspect of the present invention, a bearing includes first, second and third races. The first race has a first inner surface operatively associated with a shaft, and a first outer surface. The second race includes a second inner surface and a second outer surface. The second inner surface is in direct operational contact with the first outer surface of the first race. The first outer surface and the second inner surface cooperate to define a spherical bearing surface. In addition, the third race includes a third inner surface in operational contact with the second outer surface of the second race. In operation, the spherical bearing surface is able to accommodate angular movements of the shaft.

According to a fifth aspect of the present invention, a bearing includes a first race in operational contact with a shaft, a second race in operational contact with the first race, and a third race in operational contact with the second race. At least the first and second races cooperate to define an aperture therethrough to the shaft. A connector is disposed through the aperture for functionally interlinking the first race, the second race and the shaft to insure that the first race and the second race rotate substantially with the shaft.

According to a sixth aspect of the present invention, a self-adjusting, spherical bearing for use in air volume control louvers includes a first race having first and second surfaces. The first surface of the first race is in operational contact with a shaft. An aperture, having a first dimension, is defined in the first race and extends to the shaft. The bearing also includes a second race having an inner surface in operational contact with the second surface of the first race and an outer surface having a first axial dimension. The inner surface of the second race and the second surface of the first race cooperate to define a spherical contact surface. A second aperture, which is aligned with the aperture in the first race, is defined in the second race and has a second dimension that is larger than the first dimension. Further, the bearing includes a third race having an inner surface in operational contact with the outer surface of the second race. The inner surface of the third race has a second axial dimension that is greater than the first axial dimension. A third aperture, which is aligned with the second aperture, is defined in the third race. A connector is disposed through the first, second and third apertures to functionally interlink the first race, the second race and the shaft. In operation, the connector is able to move within the second aperture to accommodate an angular displacement of the shaft, which is borne by the spherical contact surface. Moreover, the outer surface of the second race is able to move axially along the inner surface of the third race to accommodate an axial movement and/or expansion of the shaft.

The present invention provides a bearing that can adjust for angular and axial displacements of a shaft. The bearing is substantially impervious to extreme temperature fluctuations, dirt and other contaminants, and vibrations. Furthermore, the present invention operates reliably in conditions of both constant and infrequent use.

These and other features and advantages of the present invention will be further understood upon consideration of the following detailed description of the present invention, taken in conjunction with the accompanying drawings.

BRIEF DESCRIPTION OF THE DRAWINGS

FIG. 2 is a cross-sectional view of a prior art spherical bearing.

FIG. 3 is a cross-sectional view of a prior art spherical roller bearing.

FIG. 4 is a cross-sectional view of one embodiment of a self-aligning spherical bearing of the present invention.

FIG. 5 is an end view taken along line 5—5 of FIG. 4.

FIG. 6 is a cross-sectional view of the first race of the spherical bearing shown in FIG. 4.

FIG. 7 is an end view taken along line 7—7 of FIG. 6.

FIG. 8 is a cross-sectional view of the second race of the spherical bearing shown in FIG. 4.

FIG. 9 is an end view taken along line 9—9 of FIG. 8.

FIG. 10 is a cross-sectional view of the third race of the spherical bearing shown in FIG. 4.

FIG. 11 is an end view taken along line 11—11 of FIG. 10.

DETAILED DESCRIPTION OF THE PRESENTLY PREFERRED EMBODIMENTS

Figure 1:
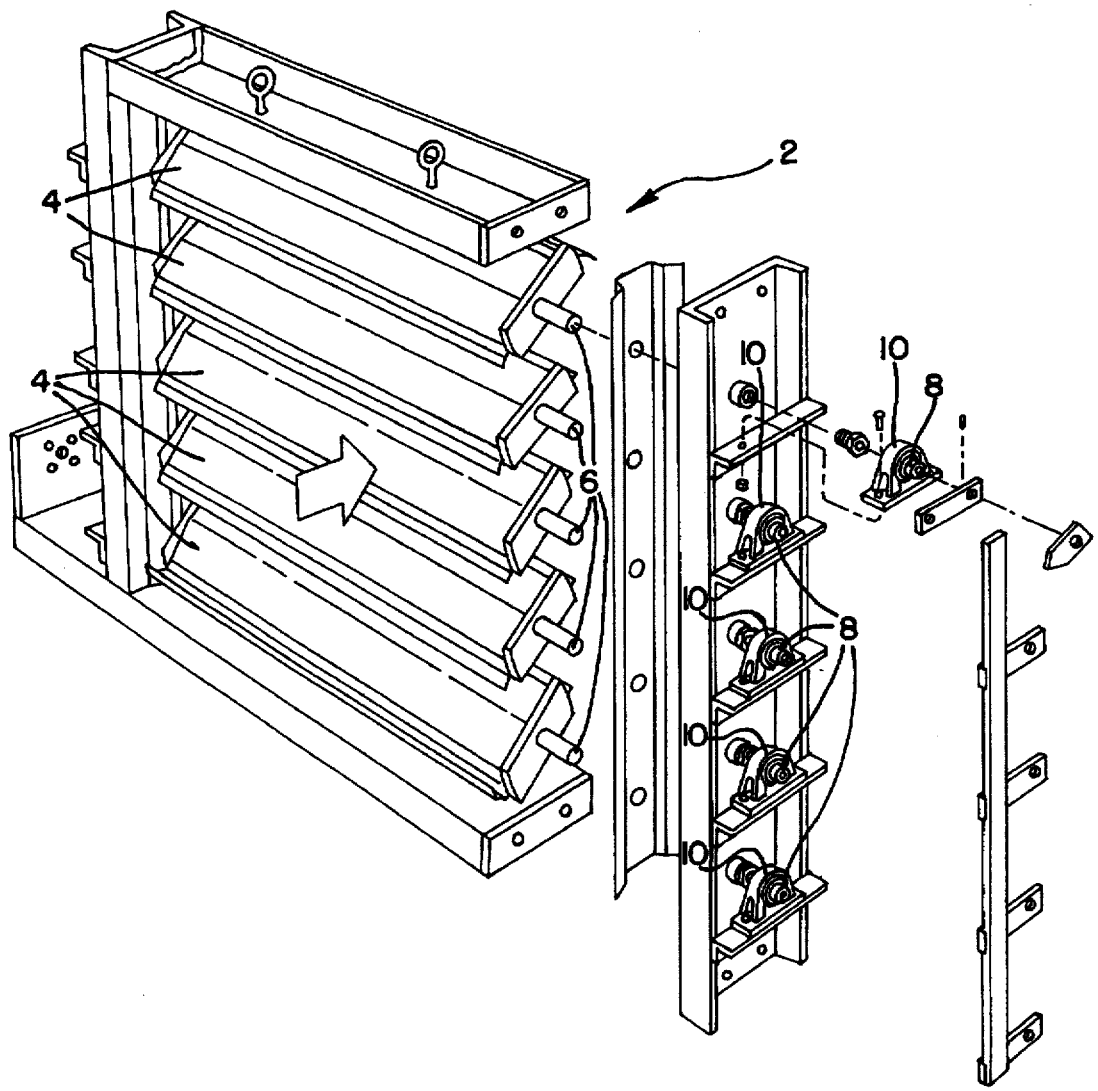
FIG. 1 is an exploded perspective view of an air volume control louver using a prior art bearing.

The present invention is described below in terms of its use with air volume control louvers which, as discussed above, operate in, for example, power plants or other industrial applications having severe environments. It is specifically contemplated, however, that the present invention can be used for any suitable equipment and in both normal and severe working environments.

A conventional bearing typically includes two races—an inner and an outer race—supported within a bearing or pillow block. Bearing designs usually dictate that the inner race is placed in operational contact with a shaft or other structure disposed within and rotatably supported by the bearing. In many designs, the shaft is keyed or otherwise attached to the inner race to eliminate or severely reduce the rotational movement of the shaft relative to the inner race. Consequently, in bearings of this sort, most, if not all, of the rotational movement of the shaft is imparted to the inner race. The inner race is typically free to rotate with respect to the outer race, and the outer race is rigidly supported by the pillow block. The rotational movement of the shaft, and thus the inner race, is borne by a bearing surface defined by the interface between the inner and outer races. To lessen the friction between the inner and outer races, balls or rollers (as in ball and roller bearings, respectively) may be positioned therebetween in tracks formed in the inner and outer races, and/or lubricants may be introduced between the inner and outer races.

In conventional bearing designs, the shaft is often left free to rotate with respect to the inner race, and is usually aided in this regard by means of lubrication disposed within the bearing between the shaft and the inner race. In these bearings, that portion of the rotational movement of the shaft that is imparted to the inner race is borne by the bearing surface.

The present invention provides a bearing structure that is different from that encountered in conventional bearings. As more fully described below, in one embodiment of the present invention, the bearing includes three races. The first, or inner, race includes an inner surface in operational contact with a shaft, and an outer surface in contact with the inner surface of the second, or intermediate, race. The first and second races cooperate to define a first bearing surface that can accommodate angular displacements and/or rotational movements of the shaft. The outer surface of the second race, in turn, cooperates with the inner surface of the third, or outer, race to define a second bearing surface. This second bearing surface is designed to accommodate axial and/or rotational movements of the shaft. Depending on the application, the shaft may be keyed or otherwise attached to the first race to eliminate or reduce relative movement therebetween. In addition, the first and second bearing surfaces may be configured to accommodate angular, axial or rotational movements of the shaft, or any combination thereof.

An example of a specific application for an embodiment of the present invention is discussed below. A representative coal-fired power plant may generate 400 Megawatts of power and burn approximately 1.2 million tons of coal per year. The fans operating in the power plant typically are rated from 1200 horsepower and 100,000 cubic feet per minute to 5000 horsepower and 600,000 cubic feet per minute. The louvers used with these fans and otherwise in the power plant may range in housing size from approximately 3'×8' with seven vanes to 4'×14' with fourteen vanes to 20'×20' with twelve vanes. As stated above, the power planet furnace operates in a temperature range between ambient and 600° F.

Turning now to the drawings, FIG. 1 illustrates a representative air volume control louver 2 found in a coal-fired power plant. The louver 2 is formed from a number of vanes 4 mounted on rotatable support shafts 6. The shafts 6 are typically supported in conventional ball bearings 8, which are in turn supported in pillow blocks 10. Instead of ball bearings 8, the shafts are sometimes merely supported in graphite bushings (not shown). As stated above, the louver vanes 4 are rotated to increase or reduce the volume of air flow therethrough.

As shown in FIG. 2, a conventional spherical bearing 12 includes an inner race 14 having an inner cylindrical surface 16 and an outer convex surface 18. The bearing 12 further includes an outer race 22 in contact with the inner race 14. The outer race 22 includes an inner concave surface 24 and an outer cylindrical surface 26. A spherical bearing surface 28 is formed between the inner surface 24 of the outer race 22 and the outer surface 18 of the inner race 14. A channel 29 for grease or other lubricant is provided in the bearing 12 to allow for the lubrication of the spherical bearing surface 28 and/or the interface between the inner race 14 and a shaft 20. The bearing 12 is supported within a pillow block 30, which prevents the outer race 22 from moving. Cooperation between the outer convex surface 18 and the inner concave surface 24 restrains the inner race 14 axially, although it is free to rotate as described below.

The shaft 20 is rotatably supported within the bearing 12 such that it is free to rotate with respect to the inner race 14.

During shaft rotation, a portion of the rotational movement of the shaft 20 is imparted to the inner race 14, and both the shaft 20 and the inner race 14 rotate with respect to the outer race 22. That portion of the rotational movement of the shaft 20 imparted to the inner race 14 is transferred to the bearing surface 28 formed between the inner race 14 and the outer race 22. Because the inner race 14 and the outer race 22 have mating convex and concave spherical surfaces, respectively, the bearing surface 28 can accommodate limited angular displacements of the shaft 20 (indicated by an Arrow A). However, as shown, the design of the bearing 12 prevents or minimizes its ability to accommodate an axial displacement of the shaft 20.

Another conventional bearing—an expansion-type spherical roller bearing 11—is shown in FIG. 3. The bearing 11 includes an inner race 13, an outer race 15 and a number of spherical rollers 17 disposed between the races 13, 15. The inner race 13 is extended along a shaft 19 supported within the bearing 11, and includes a threaded aperture 21 therein. A bolt or other connector 36 is disposed through the aperture 21 to fasten the inner race 13 to the shaft 19.

The outer race 15 includes an outer surface 23 in sliding contact with the inner surface 25 of the bearing housing 27 (e.g., a pillow block or flange housing). When the shaft 19 expands or otherwise moves axially, the inner race 13 moves with the shaft 19. The axial movement of the inner race 13 is transmitted to the outer race 15 by the rollers 17 disposed between the two races 13, 15. Thus, the movement of the inner and outer races 13, 15 within the housing 27 accommodates for axial movement of the shaft 19.

To limit the axial movement of the inner and outer races 13, 15 within the housing 27, a snap ring 31 is located in the housing 27 at one end of the bearing 11 and a shoulder 33 is provided in the housing 27 at the other end of the bearing 11. When the shaft 19 moves to the right (see FIG. 3), the outer race, 15 eventually contacts the snap ring 31. Likewise, when the shaft 19 moves to the left (see FIG. 3), the outer race 15 eventually contacts the shoulder 33 defined in the housing 27. To provide for the lubrication of the sliding surface defined between the outer surface 23 of the outer race 15 and the inner surface 25 of the bearing housing 27, a channel 35 for grease or other lubricants is provided in the housing 27. Further, to prevent dirt and other contaminants from entering the bearing 11, seals 37 are positioned between the bearing housing 27 and the shaft 19.

FIGS. 4–12 illustrate one preferred embodiment of an improved self-aligning spherical bearing 40 of the present invention. The bearing 40 can replace the conventional bearings 8, 12, 11 shown in FIGS. 1, 2 and 3, respectively. The bearing 40 of the present invention is specifically designed to operate reliably in a severe environment, such as that found in a coal-fired power plant.

As shown in FIG. 4, the bearing 40 may be supported in a pillow block or other suitable support structure 42 and generally includes a first race or collar 44, a second or intermediate race 46, and a third or outer race 48. The pillow block 42 may be attached to any suitable equipment or structure by bolts 43 or other connectors disposed therethrough. Of course, the bearing or (if used) pillow block may be mounted by any other known techniques.

As best shown in FIGS. 4, 6 and 7, the first race 44 includes a cylindrical inner wall 50 and a convex outer wall 52. A shaft 54 disposed through the bearing 40 contacts the cylindrical inner wall 50 of the first race 44.

The second race 46 of the bearing 40, as best shown in FIGS. 4, 8 and 9, includes a concave inner surface 56 and a cylindrical outer surface 58. As described below, the inner concave surface 56 of the second race 46 and the outer convex wall 52 of the first race 44 cooperate to define a spherical bearing surface 60 that accommodates angular displacements of the shaft 54.

In addition, as best shown in FIGS. 4, 10 and 11, the third race 48 of the bearing 40 includes cylindrical inner and outer surfaces 62, 64. The axial dimension of the inner surface 62 of the third race 48 is greater than the axial dimension of the outer surface 58 of the second race 46. As described in detail below, the inner cylindrical surface 62 of the third race 48 and the outer cylindrical surface 58 of the second race 46 cooperate to define a bearing surface 66 that accommodates the rotational movement and the axial displacement of the shaft 54.

As best shown in FIGS. 4 and 5, a preferred embodiment of the bearing 40 may further include an aperture 68 defined therethrough. The aperture may be divided into three sections 90, 91, 92 corresponding to the first race 44, the second race 46, and the third race 48, respectively. As shown in FIGS. 4 and 5, the sections 90, 91, 92 of the aperture 68 are preferably aligned in the bearing 40. Further, the diameters of the sections 91, 92 extending through the second and third races 46, 48 may be substantially equal, and in the embodiment illustrated are larger than the diameter of the section 90 extending through the first race 44.

As shown, a set screw, pin or other suitable connector 70 having a diameter substantially equal to or somewhat smaller than the diameter of the section 90 of the aperture 68 extending through the first race 44 may be disposed therethrough. The connector 70 includes an upper end 72 that extends through the first race 44 and into the second race 46, but not as far as the inner surface 62 of the third race 48. The connector 70 interconnects the second race 46, the first race 44 and the shaft 54, thereby insuring that the first race 44 and the second race 46 rotate at least substantially with the shaft 54.

In a preferred embodiment, the first race 44 is secured to the shaft 54 as previously described and rotates with the shaft 54. The second race 46 is not directly secured to the shaft, however, but instead is functionally interlinked by means of the lost motion connection between the connector 70 (e.g., set screw) and the aperture section 91. In particular, the connector end 72 rotates through a sufficient lost motion arc as a result of shaft rotation to contact the opposing wall of the aperture section 91. Further rotation of the shaft 54 (and therefore the connector end 72) then causes the second race 46 to rotate as well. To insure a stable connection between the shaft 54 and the first and second races 44, 46, the shaft 54 may include a threaded aperture 93 to receive the connector 70.

Because the aperture section 91 through the second race 46 preferably has a diameter sufficiently greater than the diameter of the connector 70, the first race 44 can move angularly with respect to the second race 46 without causing a mechanical interference between the protruding connector end 72 and the second race 46.

It should be understood that the respective diameters of the sections 90, 91 extending though the first and second races 44, 46, respectively, allow the connector 70 to move therein when the shaft 54 rotates without immediately interfering with the side of the section 91. Until the connector 70 and the side of the section 91 contact, slippage occurs between the first and second races 44, 46. This slippage is desirable because it reduces the possibility of the bearing 40 binding at the spherical bearing surface 60 from lack of movement or use.

In applications where the shaft 54, and thus the bearing 40, is subjected to severe loading, the bearing 40 may incorporate two or more apertures 68 and a suitable number of connectors 70.

Instead of the aperture sections 90, 91, 92 and the connector 70, other embodiments may incorporate functional alternatives thereof. For example, the first race may be keyed or otherwise connected to the shaft 54, and the first and second races 44, 46 may be fashioned with extending tabs or fingers. As the first race 54 rotates with the shaft 54, the extending tab on the first race 44 may interfere with the extending tab on the second race, thereby causing the second race 46 to rotate with the shaft 54 and the first race 44.

In other embodiments, all of the aperture sections 90, 91, 92 may not be required. For example, possibly only the first and second races 44, 46 may include aperture sections 90, 91, and the connector 70 may be used to functionally interconnect the first and second races 44, 46 and the shaft 54 outside of the bearing 40. Subsequently, the resultant unit (the first and second races 44, 46 and the shaft 54) may be inserted into the bearing 40 and placed in contact with the third race 48. Also, the sections 90, 91, 92 of the aperture 68 may have identical or varied diameters, depending on the application. Additionally, depending on the type of connector 70 used, the aperture sections 90, 91, 92 may not be threaded. Furthermore, the sections 90, 91, 92 do not necessarily have to be initially aligned for the connector 70 to functionally interconnect the shaft 54 and the first and second races 44, 46. Moreover, after shaft rotation, and thus bearing operation, commences, the orientation of the sections 90, 91, 92 may be allowed to change with respect to one another.

In operation, the shaft 54 is placed within the bearing 40 and the connector 70 is disposed through the sections 90, 91, 92 of the aperture 68 to functionally interconnect the second race 46, the first race 44 and the shaft 54. When the shaft 54 rotates, the first race 44 and the second race 46 are forced by the connector 70 to rotate with the shaft 54, as described directly above. As is evident, the rotational movement of the shaft 54 is therefore borne by the bearing surface 66 defined between the third race 48 and the second race 46.

The bearing design dictates that angular shaft displacements or misalignments (represented by Arrow B in FIG. 4), are borne by the spherical bearing surface 60 defined between the second race 46 and the first race 44. As described above, the clearance between the connector 70 and the aperture section 91 extending through the second race 46 allows the first race 44 to move angularly with respect to the second race 46. Thus, the spherical bearing surface 60 bears and is able to accommodate angular displacements of the shaft 54.

In addition, in a preferred embodiment the difference between the axial dimensions of the third race 48 and the second race 46 allows the bearing 40 to accommodate axial displacements of the shaft 54, which may be caused by thermal expansions and contractions of the shaft 54. When the shaft 54 moves axially, the connector 70 interferes with the edge of the aperture section 91 extending through the second race 46, which causes the second race 46 to move axially with the shaft 54. Because the third race 48 is wider than the second race 46, the second race 46 is able to slide along the third race 48 to accommodate the axial displacement. (Notice that the connector 70 does not interfere with the third race 48 because, as stated above, its end 72 does not extend into the third race 48.)

In an alternate embodiment, the axial dimensions of the second and third races 46, 48 may be substantially equal, or the axial dimension of the second race 46 may be greater than that of the third race 48. In this embodiment, a polymer boot or other flexible member may be disposed between the second and third races 46, 48 to seal the contact surface defined between the two races 46, 48.

As best shown in FIG. 4, to limit the axial movement of the second race 46 with respect to the third race 48, a retaining ring 76 may be placed on each side of the bearing 40. Grooves 77 are formed in the third race 48 to accommodate the retaining rings 76. If axial movement is desired to be limited in only one direction, a single retaining ring 76 may be used.

Further, to provide a fixed bearing (i.e., one that cannot accommodate axial shaft movements), one or more shims 78 may be positioned between the second race 46 and the retaining rings 76. This type of bearing may be used in those applications where it is desired to direct the axial expansion or movement of a shaft in one direction (i.e., a fixed version of the bearing 40 is used at one shaft end and a floating version of the bearing 40 is used at the other). Alternately, a conventional (i.e., non-aligning) bearing may be used to support one end of the shaft and the bearing 40 of the present invention may be used to support the other end.

Figure 12:
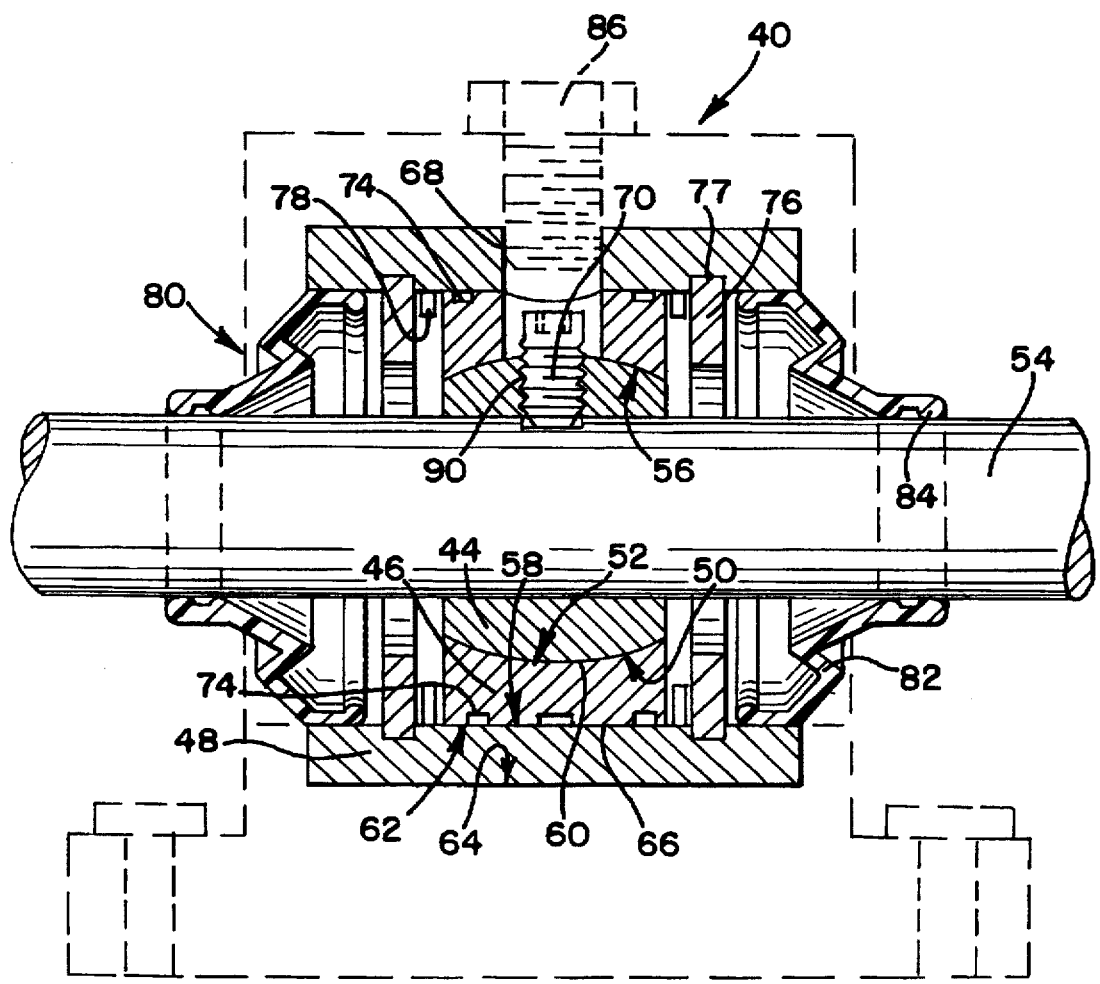
FIG. 12 is a cross-sectional view of another embodiment of a spherical bearing of the present invention incorporating a seal assembly.

To provide for bearing lubrication, the bearing 40 includes a spiral lubrication channel 74 positioned between the second and third races 46, 48, as best shown in FIGS. 4 and 12. Grease, graphite or any other lubricant suitable for the particular application at issue may be used in the bearing 40.

Furthermore, as best shown in FIG. 12, to seal the bearing 40 from the environment, and especially from the dust and ash present in a coal-fired power plant, the bearing 40 includes a seal assembly 80. The seal assembly 80 includes a bellows 82 connected to the third race 48 and extending to the shaft 54. Multiple-lip seals 84 are connected to the shaft-end of the bellows 82 and engage the shaft 54.

In addition, to further prevent the entry of contaminants into the bearing 40 before the shaft 54 is introduced therein, a lock bolt 86 is placed in the aperture 68.

The moving parts of the bearing 40 (i.e., the first race 44, the second race 46 and the third race 48) may be formed from a variety of materials, including steel, bronze, graphite, teflon and plastics. In addition, depending on the application, the bellows 82 may be formed from steel, natural rubber or a polymeric material. The length of the bearing 40 can be varied depending on the application. For example, the length of the bearing 40 could vary from less than 1 inch for light duty applications to as much as 1 foot for heavy duty applications.

By substantially locking the rotation of the first race 44 with the shaft 54, the bearing 40 of the present invention reduces shaft wear. Also, because the interference fit between the shaft 54 and the bearing 40 is enclosed by the seal assembly 80, contaminants are prevented from entering the bearing 40 and causing the shaft 54 or bearing 40 to seize. Moreover, because at the commencement of shaft rotation the connector 70 allows a small amount of rotation at the spherical bearing surface 60 (i.e., between the first race 44 and the second race 46), the spherical bearing surface 60 will not seize due to lack of movement.

The present invention provides a bearing 40 that accommodates continuous axial and angular shaft displacements and is readily adaptable to most, if not all, popular bearing housings. The bearing 40 includes a substantially impervious seal assembly 80 that seals all of the moving parts thereof, and may be installed as an assembled unit. In addition, due to the seal assembly 80 and the interrelationship between the shaft 54, the first race 44, the second race 46 and the third race 48, the bearing 40 will operate reliably in applications requiring either constant or infrequent use.

While the bearing 40 of the present invention has been described above chiefly in terms of its use for louvers in a severe environment, it is to be understood that the bearing 40 may be used for a wide variety of applications and in both normal and severe working environments.

It should be appreciated that the present invention may be modified or configured as appropriate for the application. The embodiments described above are to be considered in all respects only as illustrative and not restrictive. Changes may be made without departing from the spirit of the invention. The scope of the invention is indicated by the following claims rather than by the foregoing description. All changes which come within the literal meaning as well as the range of equivalency of the claims are to be embraced within their scope.

I claim:

1. A bearing comprising:
   a first race comprising a first surface which in use is in contact with a shaft and a second surface, the first race defining an aperture therethrough to the shaft, the aperture having a first dimension;
   a second race comprising an inner surface in contact with the second surface of the first race, the inner surface of the second race and the second surface of the first race defining a spherical contact surface, the second race defining a second aperture aligned with the aperture in the first race, the second aperture having a second dimension that is larger than the first dimension;
   a third race in contact with the second race; and
   a connector disposed through the first and second apertures connecting the first race and the shaft;
   whereby the connector is able to move within the second aperture to accommodate an angular displacement of the shaft that is borne by the spherical contact surface.

2. The bearing of claim 1 wherein the first race and the second race rotate with the shaft.

3. The bearing of claim 1 wherein the second surface of the first race is convex and the inner surface of the second race is concave.

4. The bearing of claim 1 wherein the second race further comprises an outer surface in contact with an inner surface of the third race.

5. The bearing of claim 4 wherein the outer surface of the second race comprises a first axial dimension and the inner surface of the third race comprises a second axial dimension that is greater than the first axial dimension, whereby the second race is able to move axially along the third race to accommodate an axial movement of the shaft.

6. The bearing of claim 1 wherein the connector comprises a set screw.

7. A bearing comprising:
   a first race comprising a first inner surface for engagement with a shaft and a first outer surface;
   a second race comprising a second inner surface and a second outer surface, the second inner surface in contact with the first outer surface of the first race;
   a lost motion connector interlinking the second race and the shaft such that the shaft may rotate through a limited arc without rotating the second race, but the second race will thereafter rotate when the lost motion connector engages the second race; and
   the first race and the second race each define an aperture therethrough, and further wherein the lost motion connector is disposed through the aperture to the shaft to ensure that the first race and the second race rotate with the shaft.

8. The bearing of claim 7 wherein the aperture defined in the first race comprises a first dimension, and the aperture defined in the second race comprises a second dimension that is greater than the first dimension.

9. The bearing of claim 7, further comprising a third race comprising a third inner surface in contact with the second outer surface of the second race.

10. A bearing comprising:
   a first race in contact with a shaft;
   a second race in contact with the first race;
   a third race in contact with the second race, wherein at least the first race and the second race cooperate to define an aperture therethrough to the shaft; and
   a connector disposed through the aperture interlinking the first race, the second race and the shaft such that the first race and the second race are rotatable by the shaft.

11. The bearing of claim 10 wherein the connector comprises a set screw.

12. The bearing of claim 10 wherein the first race comprises an outer surface and the second race comprises an inner surface, the outer surface and the inner surface defining a spherical contact surface.

13. The bearing of claim 12 wherein the outer surface is convex and the inner surface is concave.

14. The bearing of claim 10 wherein the second race comprises an outer surface having a first axial dimension and the third race comprises an inner surface having a second axial dimension that is greater than the first axial dimension, whereby the second race is able to move with respect to the third race to accommodate for an axial movement of the shaft.

15. A self-adjusting, spherical bearing for use in air volume control louvers, the bearing comprising:
   a first race comprising a first surface in contact with a shaft and a second surface, the first race defining an aperture therethrough to the shaft, the aperture having a first dimension;
   a second race comprising an inner surface in contact with the second surface of the first race and an outer surface having a first axial dimension, the inner surface of the second race and the second surface of the first race defining a spherical contact surface, the second race defining a second aperture aligned with the aperture in the first race, the second aperture having a second dimension that is larger than the first dimension;
   a third race comprising an inner surface in contact with the outer surface of the second race, the inner surface of the third race having a second axial dimension that is greater than the first axial dimension, the third race defining a third aperture aligned with the second aperture in the second race; and
   a connector disposed through the first, second and third apertures interlinking the first race, the second race and the shaft;

whereby the connector is able to move within the second aperture to accommodate an angular displacement of the shaft that is borne by the spherical contact surface and the outer surface of the second race is able to move axially along the inner surface of the third race to accommodate an axial movement of the shaft.

16. The bearing of claim 15 wherein the second surface of the first race is convex and the inner surface of the second race is concave.

17. The bearing of claim 15, further comprising at least one retaining ring disposed along the inner surface of the third race, the retaining ring limiting the axial movement of the second race along the third race.

18. A bearing comprising:
   a first race comprising a first inner surface connected in use with a shaft and a first outer surface;
   a second race comprising a second inner surface and a second outer surface, the second inner surface being in contact with the first outer surface of the first race, the first outer surface of the first race is convex, and the second inner surface of the second race is concave, thereby defining a spherical bearing surface; and
   a third race, comprising a third inner surface in contact with the second outer surface of the second race;
   whereby the spherical bearing surface is able to accommodate for angular movements of the shaft.

19. A bearing comprising:
   a first race comprising a first inner surface connected in use with a shaft and a first outer surface;
   a second race comprising a second inner surface and a second outer surface, the second inner surface being in contact with the first outer surface of the first race, the first outer surface and the second inner surface defining a spherical bearing surface;
   the first race, the second race and the shaft are interlinked by means of a lost motion connection such that the first race and the second race are rotatable with the shaft; and
   a third race, comprising a third inner surface in contact with the second outer surface of the second race;
   whereby the spherical bearing surface is able to accommodate for angular movements of the shaft.

20. The bearing of claim 19 wherein at least the second race and the first race cooperate to define an aperture therethrough to the shaft, and further wherein the lost motion connection is a connector disposed through the aperture to interlink the second race, the first race and the shaft.

21. The bearing of claim 20 wherein a dimension of the aperture is greater than a dimension of the connector.

22. The bearing of claim 21 wherein a difference between the dimensions of the aperture and the connector allows the bearing to accommodate angular displacement of the shaft relative to the bearing.

23. The bearing of claim 20 wherein the connector comprises a set screw.

* * * * *

UNITED STATES PATENT AND TRADEMARK OFFICE
CERTIFICATE OF CORRECTION

PATENT NO. : 5,676,468
DATED : October 14, 1997
INVENTOR(S) : John P. Webb

It is certified that error appears in the above-identified patent and that said Letters Patent is hereby corrected as shown below:

<u>In the Claims</u>

In claim 7, line 1, change "beating" to --bearing--.

Signed and Sealed this

Eighteenth Day of April, 2000

Attest:

Q. TODD DICKINSON

*Attesting Officer*     *Director of Patents and Trademarks*